US008463651B2

(12) United States Patent
Connors et al.

(10) Patent No.: US 8,463,651 B2
(45) Date of Patent: Jun. 11, 2013

(54) NON-INSTRUMENTED PERISHABLE PRODUCT TRACKING IN A SUPPLY CHAIN

(75) Inventors: Daniel P. Connors, Pleasant Valley, NY (US); Markus R. Ettl, Ossining, NY (US); Mary E. Helander, White Plains, NY (US); Shubir Kapoor, Shrub Oak, NY (US); Stuart A. Siegel, Millburn, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/117,567

(22) Filed: May 27, 2011

(65) Prior Publication Data
US 2012/0303492 A1 Nov. 29, 2012

(51) Int. Cl.
G06G 1/14 (2006.01)
G06Q 20/00 (2012.01)
G07G 1/12 (2006.01)
G07G 5/00 (2006.01)
G07G 1/10 (2006.01)

(52) U.S. Cl.
USPC .......... 705/22; 705/23; 705/24; 705/25

(58) Field of Classification Search
USPC .................. 705/22, 23, 24, 25
See application file for complete search history.

(56) References Cited

U.S. PATENT DOCUMENTS

| | | | | |
|---|---|---|---|---|
| 6,327,576 B1 * | 12/2001 | Ogasawara | | 705/22 |
| 6,826,119 B2 | 11/2004 | Fortune | | |
| 7,142,118 B2 * | 11/2006 | Hamilton et al. | | 340/572.1 |
| 7,464,873 B2 * | 12/2008 | Spencer et al. | | 235/385 |
| 7,495,558 B2 * | 2/2009 | Pope et al. | | 340/572.1 |
| 7,675,424 B2 * | 3/2010 | Debord et al. | | 340/588 |
| 2003/0204450 A1 * | 10/2003 | Heinrichs et al. | | 705/28 |
| 2004/0148217 A1 * | 7/2004 | Lauring et al. | | 705/10 |
| 2006/0277109 A1 * | 12/2006 | Kerth et al. | | 705/20 |
| 2007/0087756 A1 * | 4/2007 | Hoffberg | | 455/450 |
| 2008/0103851 A1 * | 5/2008 | Walker et al. | | 705/7 |
| 2008/0120129 A1 * | 5/2008 | Seubert et al. | | 705/1 |
| 2009/0095813 A1 * | 4/2009 | Chang et al. | | 235/385 |
| 2009/0099862 A1 * | 4/2009 | Fireman et al. | | 705/2 |
| 2010/0042463 A1 * | 2/2010 | Brockman et al. | | 705/9 |
| 2010/0134257 A1 * | 6/2010 | Puleston et al. | | 340/10.4 |

(Continued)

OTHER PUBLICATIONS

Ilic, A, et al. (2009). Increasing Supply-Chain Visibility with Rule-Based RFID Data Analysis. IEEE Computer Society ("NPL1").*

(Continued)

*Primary Examiner* — Elaine Gort
*Assistant Examiner* — Peter L Ludwig
(74) *Attorney, Agent, or Firm* — Scully, Scott, Murphy & Presser, P.C.; Daniel P. Morris, Esq.

(57) ABSTRACT

There are provided a system, a method and a computer program product for tracking an inventory distribution of a perishable product in a supply chain. The system receives shipment data and point of sale data for the product from every location in the supply chain. The system creates, based on the obtained shipment data and the point of sale data, a network graph that represents a flow of the product in the supply chain. The system identifies an age of unsold inventory of the product at each node of the graph based on the created graph. The system provides a notification to a user at each location that informs the age of the unsold inventory of the product at that location.

24 Claims, 7 Drawing Sheets

U.S. PATENT DOCUMENTS

2011/0029413 A1* 2/2011 Ben-Tzur et al. .............. 705/28
2011/0270708 A1* 11/2011 Walden ...................... 705/27.1
2012/0095581 A1* 4/2012 Wood et al. .................. 700/100

OTHER PUBLICATIONS

Inlibra Suite Composition Tracking Brochure, 2008-2010 Inlibra Solutions Corp. ("NPL2").*
Shi, J & Zhang, J (2010). Optimizing distribution strategy for perishable foods using RFID and sensor technologies. J. of Bus. And Indus. Marketing 25(8), 596-606.*
Li, F & Wei, Y (2008). A real-time vehicle routing system for RFID-tagged goods transportation. IEEE.*
Zanoni, S & Zavanella, L (2007). Single-vendor single-buyer with integrated transport inventory system: models and heuristics in the case of perishable goods. Comp. & Indus. Eng. 52, 107-123.*
Bhushan, N & Gummaraju, K (2008). A petri net based simulation approach for evaluating benefits of time temperature indicator and wireless technologies in perishable goods retail management. Infosys White Paper.*
Saygin, C et al. (2007). A systems approach to viable RFID implementation in the supply chain.*
Liu, R. et al. (2007). A formal modeling approach for supply chain event management. Decision Support Systems 43, 761-778.*
"IntelliTrack", http://www.intellitrack.net/BARCODE_SOFTWARE.ASP, captured May 3, 2011.

* cited by examiner

```
function generateInventoryAge(Node n, Date d)
/** Generate priority queues for inbound and outbound flows of n. Each queue
is sorted (priortized) in ascending order of the date for which in flows or
out flows occurred. */
PriorityQueue inQ,outQ;
for (all incoming edges (flows) i of n)
    inQ.insert(i)
for (all outgoing edges (flows) o of n)
    outQ.insert(o)
while (outQ has elements)
{
    o = outQ.pop() /** remove first element */
    outquant = o.quantity
    /** "consume" quantity from in bound flows (e.g., inventory) */
    while (outquant > 0)
    {
        i = inQ.pop() /** remove first inventory flow */
        tmp = outquant
        outquant -= i.q /** decrement by amount in inventory */
        i.q -= tmp /** inventory now has this much less */
        if i.q > 0: /** if there's something left, it goes back in queue */
            inQ.push(i)
    }
}/** now for all flows remaining in inQ, accumulate them in a Histogram
object, determining age based on given date d */
Histogram histogram;
while (inQ has elements)
{
    i = inQ.pop()
    age = d - inQ.date
    histogram.add(age)
}
return histogram
```

NON-INSTRUMENTED PERISHABLE PRODUCT TRACKING IN A SUPPLY CHAIN

BACKGROUND

The present application generally relates to an inventory management. More particularly, the present application relates to tracking an age of a perishable product at each location in a supply chain.

Currently, companies (e.g., FedEx®, UPS®, DHL®, Wal-Mart®, etc.) use RFID (Radio-Frequency-Identification) and/or barcode scanning technologies to track items (e.g., packages, products, clothes, foods, etc.) in their warehouse and/or inventories. Inventory management systems/programs (e.g., IntelliTrack® Software from IntelliTrack®, Inc., etc.) using RFIDs and barcodes work well if a single party controls its supply chain and the diversity in product types and packaging configurations is relatively small (e.g., the number of different product types is less 1,000). A supply chain refers to entities, organizations, resources and/or people involved in moving a product from its manufacture to its consumers. For examples, UPS® attaches a unique barcode on each item and handles each item from transportation to a delivery. However, if a supply chain is managed by diverse parties (e.g., wholesale stores, retail stores, distributors, etc.), using RFIDs or barcodes to manage inventories in the supply chain can be costly. Perishable food products are typically packaged in a wide variety of forms and have a large volume (e.g., more than 1,000 products) of movement through a supply chain making individual barcode or RFID tracking impractical. As a result, product manufacturers and retailers may not be able to identify poorly performing entities of the supply chain, for example, a retail store that has an excess of products in inventory near their expected end-of-life date.

SUMMARY OF THE INVENTION

The present disclosure describes a system, method and computer program product for tracking an inventory distribution of a perishable product at each location in a supply chain.

In one embodiment, there is provided a system for tracking an inventory age distribution of a perishable product in a supply chain. The system is a computing system including at least one memory device and at least one processor device connected to the memory device. The computing system receives shipment data and point of sale data for a product from every location in the supply chain. The computing system automatically creates, based on the obtained shipment data and the point of sale data, a network graph that represents a flow of the product in the supply chain. The graph includes a plurality of nodes interconnected by a plurality of arcs. A node in the graph represents a location in the supply chain. An arc represents a shipment of the product from a node to another node. The arc includes information of: a movement date of the product and quantity of the product moved. The computing system automatically identifies an age of unsold inventory of the product at each node of the graph based on one or more of: the arc information in the created network graph, a product manufacture date of the unsold inventory of the product and a date for which the unsold inventory of the product entered into the supply chain. The computing system automatically provides a notification to a user at each location represented by a node of the created network graph. The provided notification includes one or more of: the calculated age of the unsold inventory of the product at the location associated with the user, and a percentage of the unsold inventory of the product that are over a given threshold at the location associated with the user.

In a further embodiment, the shipment data includes one or more of: a date of a shipment of the product, a name of the product, a manufacturer of the product.

In a further embodiment, the point of sale data includes one or more of: quantity of the product shipped, a location that ships the product, a location that receives the product.

In a further embodiment, the computing system compares, at each node of the created network graph, the identified age of the unsold inventory of the product to a threshold. The computing system generates an alert, for a transmission to a corresponding node, of the unsold inventory if the age is larger than the threshold. The computing system recommends an action to the corresponding node.

In a further embodiment, the identifying the age of the unsold inventory of the product includes: applying a mass balance technique at each node in the created network graph and receiving information regarding an inventory rotation policy of each node of the created network graph.

In a further embodiment, the applying the mass balance technique comprises: determining that a quantity of the product entered at a first node in the created network graph is equal to an addition of quantity of the product remained at the first node and quantity of the product shipped from the first node.

In a further embodiment, the inventory rotation policy includes one or more of: FIFO (First-In-First-Out) and LIFO (Last-In-First-Out).

In a further embodiment, the created network graph informs a manufacture of the product how an individual location of the supply chain maintains inventory of the product and provides the age of the unsold inventory of the product to each location of the supply chain.

In a further embodiment, the product does not include a barcode or RFID (Radio-frequency identification).

BRIEF DESCRIPTION OF THE DRAWINGS

The accompanying drawings are included to provide a further understanding of the present invention, and are incorporated in and constitute a part of this specification.

FIG. 5 illustrates exemplary pseudo code run by a computing system for tracking an inventory distribution of a perishable product in a supply chain in one embodiment.

DETAILED DESCRIPTION

Being able to track and estimate an age of a perishable product at all locations within a supply chain is an important capability for many industries (e.g., food industry, pharmaceutical industry, etc.). An age of a product refers to time elapsed since the product was manufactured. In one embodiment, each single product has a different age. A perishable product refers to a product having limited life span. A perishable product includes, but is not limited to: dairy products, e.g., milk, butter, cheese, ice cream, vegetables, juices, produces, cookies, chocolate, meat products, frozen products, uncooked or cooked food, fish, beverage, etc. This capability to track and estimate an age of the perishable product enables its manufacturer to identify where product expirations will occur, and which retail retailer locations, if any, lag behind others in selling the product. This capability can also improve an inventory management, product ordering, and product promotion policies.

In one embodiment, it is assumed that product shipment data and point of sale data (dates, product quantities, and locations) are known for a product. Product shipment data includes, but is not limited to: a date of a shipment of a product, a name of the product, a manufacture of the product, etc. Point of sale data includes, but is not limited to: quantity of a shipped product, a location that ships the product, a location that receives the shipped product, etc. In one embodiment, the product shipment and point of sales data may include Universal Product Code (UPC) information. The computing system may leverage this information and dates to calculate the age of the product, instead of using physical tracking techniques, e.g., embedding RFIDs in products.

Figure 2:
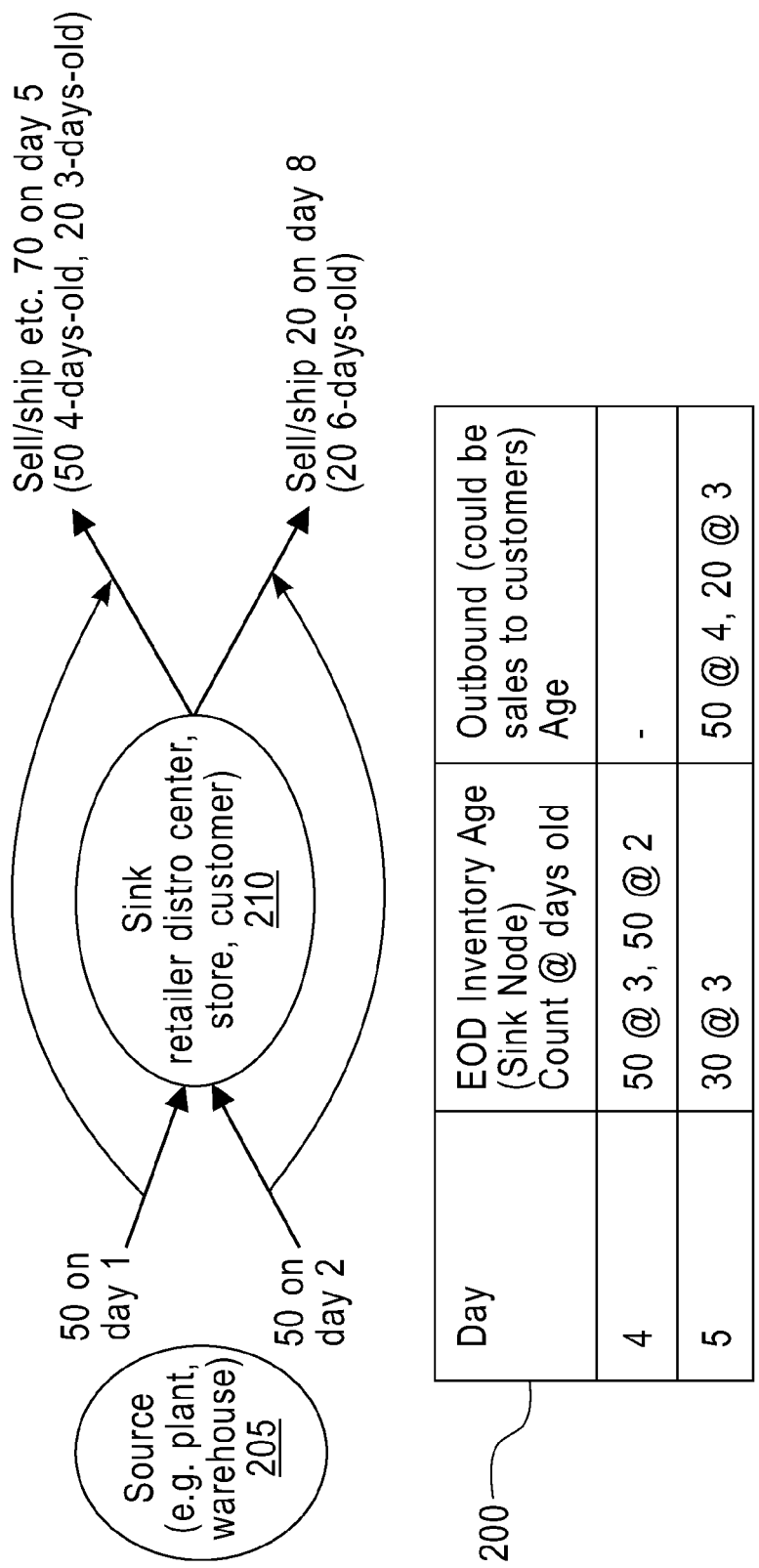
FIG. 2 illustrates applying a mass balance technique and an inventory rotation policy at an exemplary location of a supply chain in one embodiment.
Figure 3:
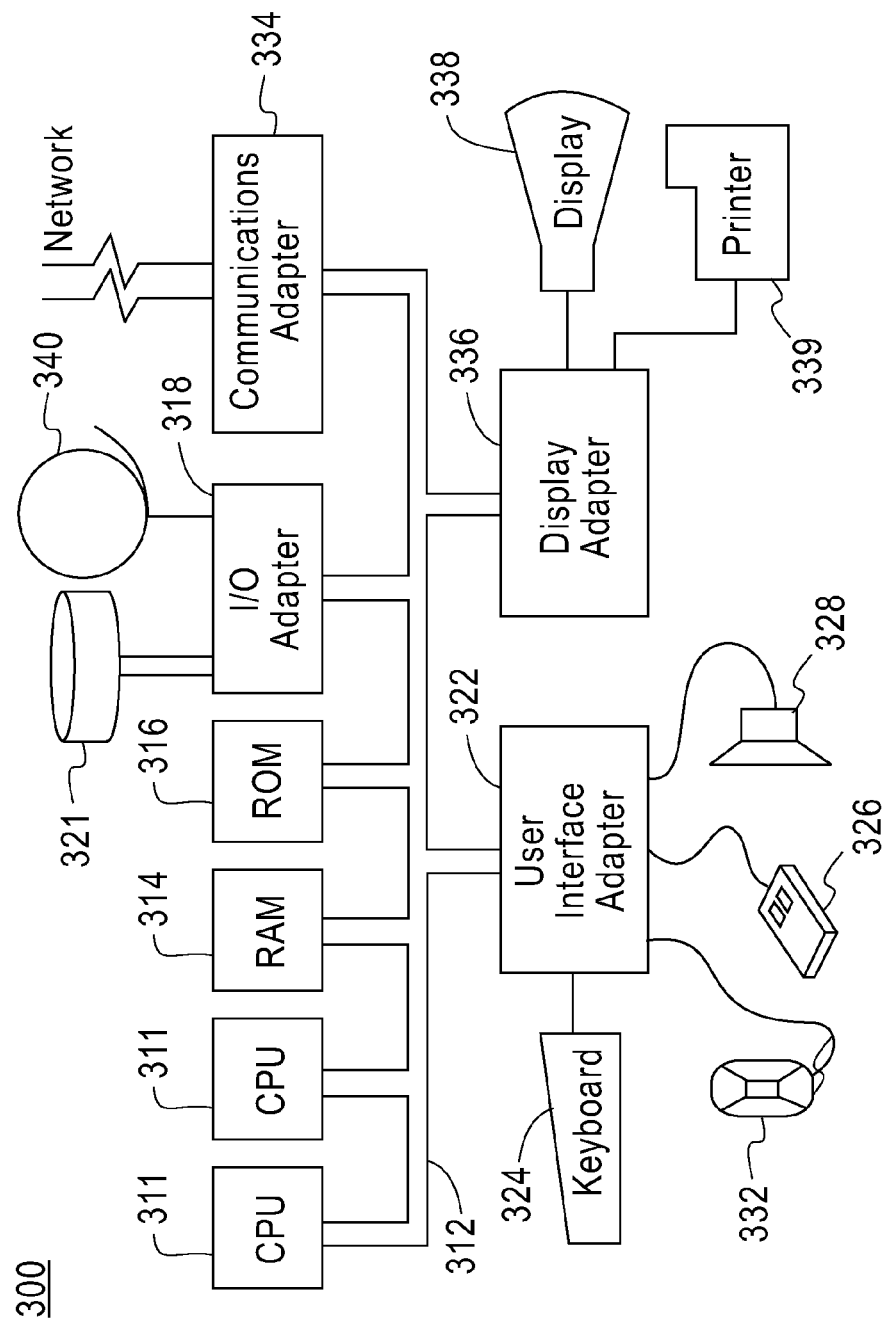
FIG. 3 illustrates an exemplary hardware configuration for implementing the flow chart depicted in FIG. 1 in one embodiment.

Based on these shipment data and point of sale date, a computing system (e.g., a computing system 300 shown in FIG. 3, a data management system, for example, IBM® Information Management System (IMS™), etc.) creates a network graph (e.g., a network graph 160 in FIG. 1B), e.g., by representing each location in the supply chain as a single node and representing a product flow from a location to another location by an arc. As shown in FIG. 2, the computing system applies one or more of heuristics (e.g., mass balance technique and/or inventory rotation policies) to data represented in the network graph to estimate an age and/or a remaining time until an expiration date at all locations in a supply chain. FIG. 2 is described in detail below. A mass balance technique describes that quantity of a product entered at a location (i.e., a node in the network graph) in the supply chain is equal to an addition of quantity of the product remained at that location and quantity of the product shipped from that location. According to the mass balance technique, an inbound flow of a product serves as a source for an outbound flow of the product. An inventory rotation policy includes, but is not limited to: FIFO (First-In-First-Out), LIFO (Last-In-First-Out), a mix of FIFO and LIFO. FIFO inventory policy refers that an item which enters first is shipped or sold first. LIFO inventory policy refers that an item which enters last is shipped or sold first. A mix of FIFO and LIFO refers to using both FIFO and LIFO. For example, a supermarket may display items according to FIFO inventory policy, e.g., by placing the oldest item at the front of a shelf, but consumers in the supermarket may purchase items according to LIFO inventory policy, e.g., by taking the youngest item from behind of the shelf.

In one embodiment, the created network graph represents a supply chain of a product. In the network graph, a node represents a location in the supply chain, e.g., a retail store, a manufacture, a wholesale store, a warehouse, a distribution center, etc. By applying the mass balance technique and inventory rotation policies on the network graph, each location of the supply chain can be alerted to the fact that more that a certain percentage of unsold inventory of a product in that location has less than a certain number of days to its expiration date. How to apply the mass balance technique and inventory rotation policies on the network graph is illustrated in FIG. 2 and described in below. This creating the network graph and alerting each location does not require RFID and/or barcode on the product. This creation of the graph and alerting are applicable to any product whose shipment data and point of sale data are available.

In one embodiment, by viewing the created network graph, a manufacturer can identify poorly performing parts of its supply chain, e.g., by reviewing an age of unsold inventory at each node of the graph, and can identify which retail stores maintains their inventories of a product below a pre-determined freshness threshold. A poorly performing part of a supply chain refers to a location, in the supply chain, which possesses a certain number of unsold inventory of a product (e.g., the number of unsold inventory is larger than a pre-determined threshold) which are about to expire. By identifying the poorly performing entities of its supply chain, the manufacture may suggest inventory policies to the identified poorly performing parts, e.g., by suggesting an improvement in a mode of product shipping, e.g., transportation or delivery network. Alternatively, the manufacture may adjust its production schedule in accordance with an age of unsold inventory of each location in the supply chain.

Figure 1A:
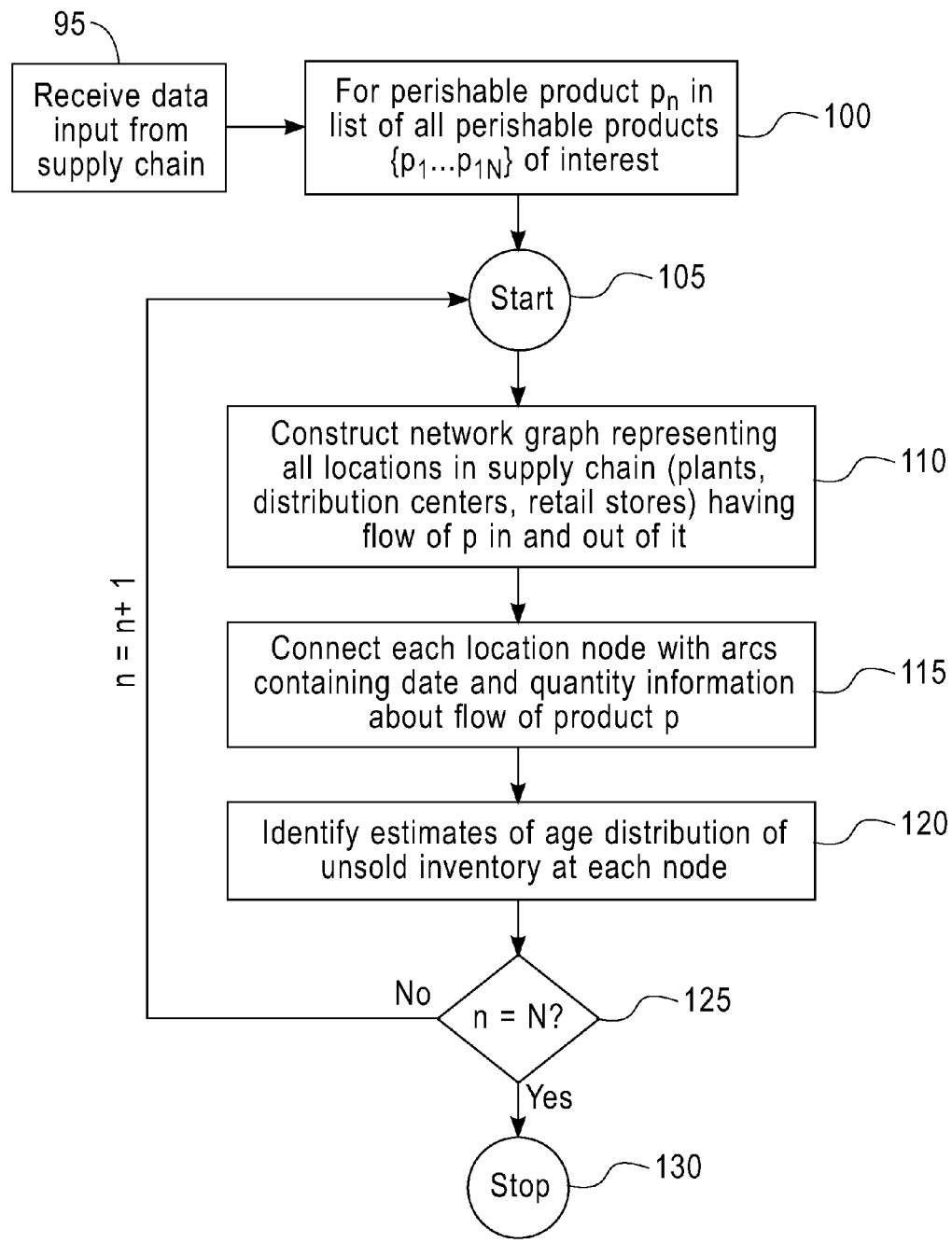
FIG. 1A is a flow chart that describes method steps for tracking an inventory distribution of a perishable product in a supply chain in one embodiment.

FIG. 1A is a flow chart describing method steps for tracking an inventory distribution of a perishable product in a supply chain in one embodiment. At steps 95-100, a computing system (e.g., a computing system 300 shown in FIGS. 1B and 3) periodically receives shipment data and point of sale data for a product from every location in the supply chain, e.g., via a wired or wireless communication network (e.g., a communication network 170 shown in FIG. 1B) or the Internet. For example, the computing system receives retail data from a retail store. Retail data includes, but is not limited to: inventory, received orders, sales, shipments, shrinkage, reclamations, etc. The computing system may receive manufacturing data from a manufacture of the product. The manufacturing data includes, but is not limited to: a manufactured date of the product, an expiration date of the product, etc. At steps 105-115, the computing system creates a network graph (e.g., a network graph 160 shown in FIG. 1B) that represents a flow of the product in the supply chain, based on the received shipment data and point of sale data. A network graph may include a plurality of nodes and a plurality of arcs. A node in the graph represents a location (e.g., a manufacture 135, a distribution center 140, a wholesaler 145, a retail store 150, etc. shown in FIG. 1B) in the supply chain. An arc represents a shipment of the product from a node to another node. The arc includes information of an age of the product and a quantity of the shipment. At step 120, the computing system identifies the age of unsold inventory of the product at each node of the graph.

FIG. 2 illustrates an exemplary network graph to identify an age of unsold inventory of a product at an exemplary node in the network graph in one embodiment. In this embodiment, each node tracks the age of unsold inventory of the product. For example, each node may maintain a table, e.g., a table 200 to track the age of unsold inventory of the product. The computing system updates the table 200 based on the mass balance technique and an inventory rotation policy. For example, according to the mass balance technique, the number of items entered at a node from other nodes or manufactures is equal to the addition of the number of items remained at the node and the number of items left from the node. For example, a manufacture 205 produces fifty items on the first day and ships the fifty items to a location 210 on the first day. The manufacture 205 also produces another fifty items on the second day and ships the fifty items to the location 210 on the second day. Then, at the end of the second day, the location 210 has one hundred items, if it is assumed that the location 210 does not ship any of these one hundred items to other location(s) until the fifth day. At the end of the second day, the location 210 has fifty items which are one day old and fifty items which are zero day old. As a day is passed, the computing system increments an age of unsold inventory of that product at each node in the graph. For example, on the fourth day, as shown in the table 200, the location 210 has fifty items which are three days old and another fifty items which are two days old. Assume that the location 210 ships 70 items to another location on the fifth day according to FIFO inventory policy. Specifically, on the fifth day, the location 210 ships fifty items which are four days old and twenty items which are three days old. Then, at the end of the fifth day, the location 210 still has, in its inventory, thirty items which are three days old. Further assume that the location 210 ships twenty items which are six days old on the eighth day. Then, the location 210 still has, in its inventory, unsold ten items which are six days old at the end of the eighth day.

Returning to FIG. 1, at step 125, the computing system evaluates whether an age of unsold inventory of the product at each location of the supply chain has been identified, e.g., as shown in FIG. 2. If the computing system has identified the age of unsold inventory of the product at each location of the supply chain, at step 130, the computing system completes the method steps illustrated in FIG. 1. Otherwise, the computing system repeats steps 105-125 until the computing system identifies the age of unsold inventory of the product at every location in the supply chain.

In one embodiment, upon identifying the age of the unsold inventory of the product at a location of the supply chain, the computing system provides a notification (e.g., email, alert, text message, etc.) to a user (e.g., a location manager, etc.) at that location. The provided notification includes one or more of: the identified age of the unsold product of the product at that location, a percentage of the unsold inventory of the product that are near expiration dates, i.e., a certain number of days (e.g., two or three days) are remained until the expiration date).

In another embodiment, at each node of the graph, the computing system compares the identified age of the unsold inventory of the product to a pre-determined threshold. If the identified age of the unsold inventory of the product is larger than the threshold, the computing system generates an alert to an inventory manager of the unsold inventory. Then, the inventory manager may conduct a sales promotion of the unsold inventory in response to the generated alert.

The network graph (e.g., network graph 160 shown in FIG. 1B) is provided in a form of viewing or displaying to inform a manufacture of the product how an individual location of the supply chain maintains inventory of the product and provides the age of the unsold inventory of the product to a corresponding location of the supply chain. In response to the provided age of the unsold inventory, each location may react differently to reduce the unsold inventory, e.g., by returning the unsold inventory to the manufacture, conducting a sales promotion, etc.

In one embodiment, the product, whose age is tracked by the computing system according to the method steps in FIG. 1, does not include physical and costly tracing devices, e.g., RFID (Radio Frequency Identification) or bar code on the product. In this embodiment, each location in the supply chain arranges each product according to its age informed from the network graph.

Figure 1B:
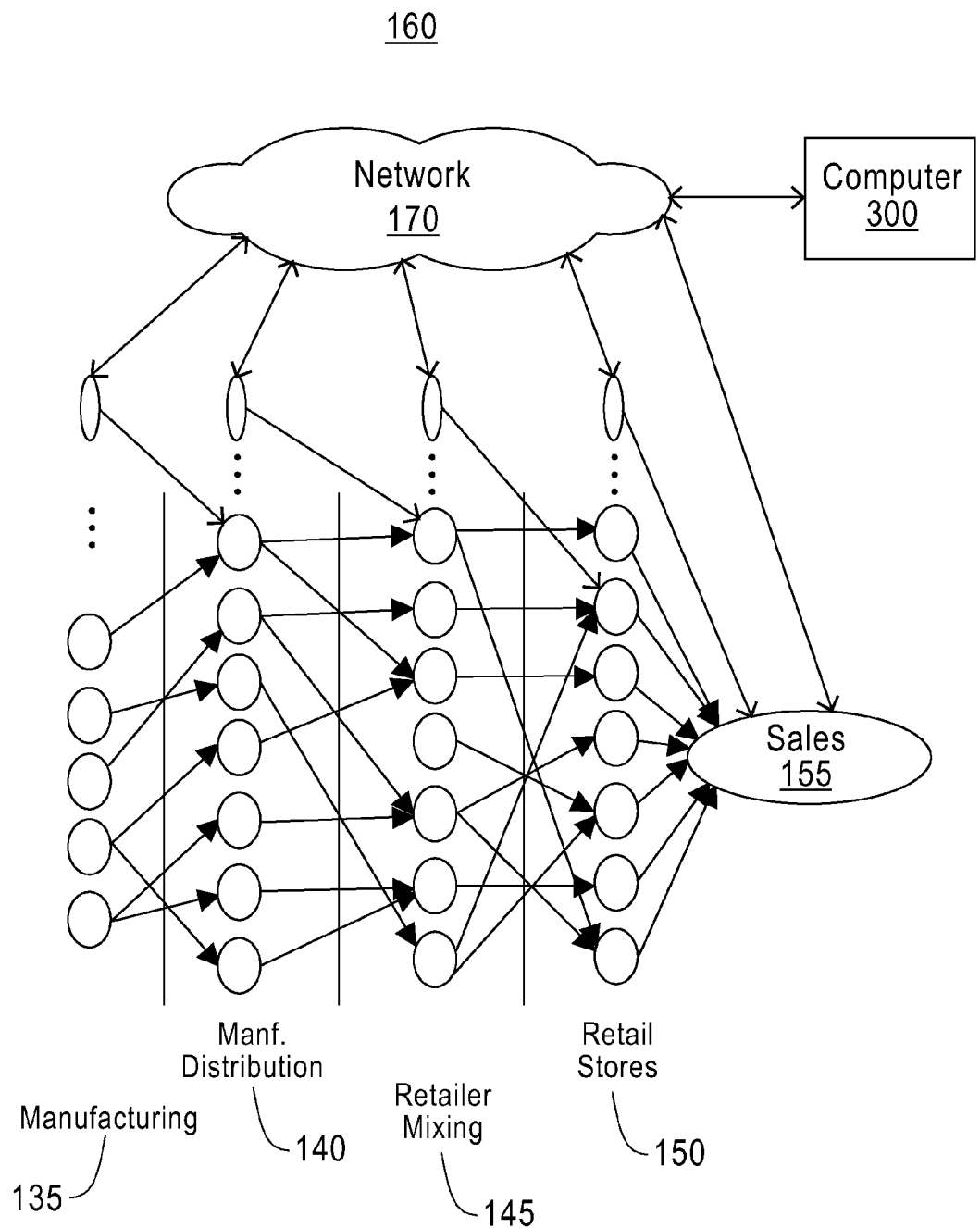
FIG. 1B is an exemplary network graph created by running method steps described in FIG. 1A in one embodiment.
Figure 4:
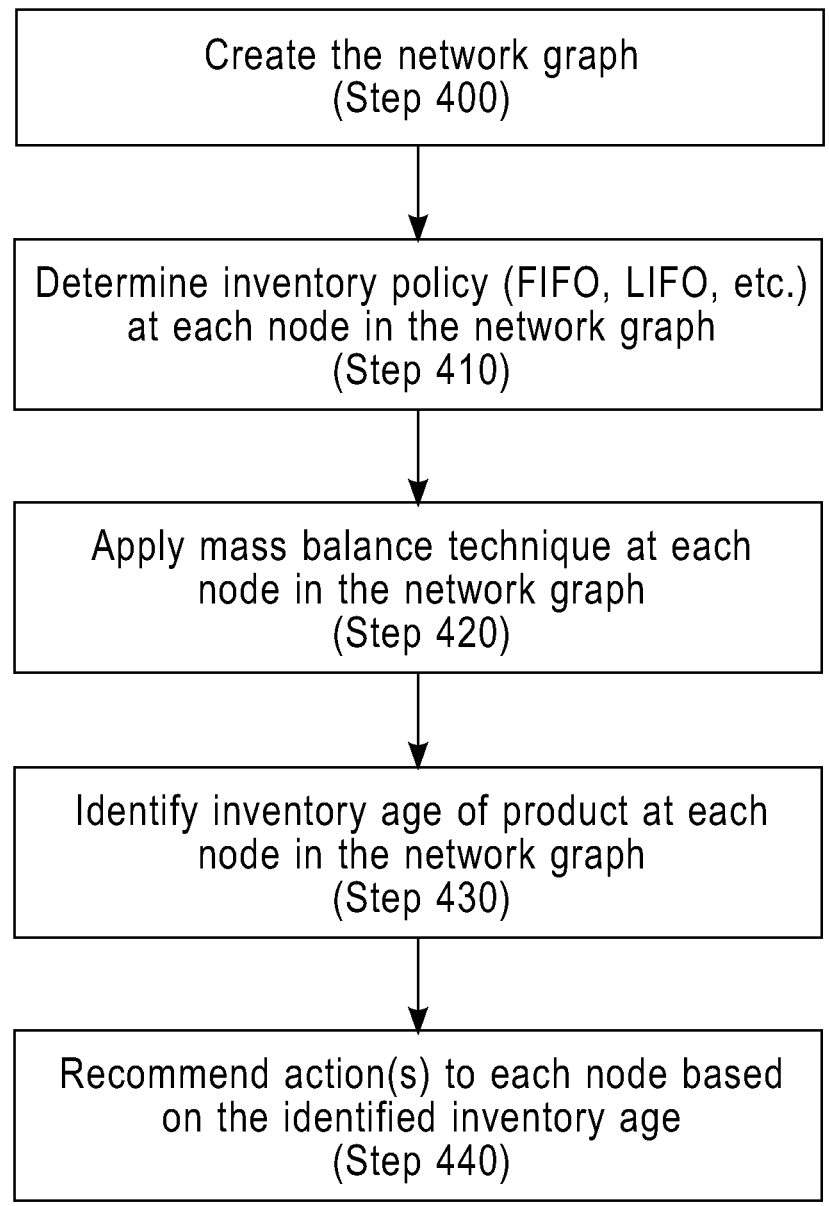
FIG. 4 is a flow chart depicting method steps implemented by an entity, e.g., a third party service that includes a central computing system in one embodiment.

FIG. 4 is a flow chart depicting method steps implemented by an entity, e.g., a third party service that includes a central computer system 300 shown in FIGS. 1B and 3) in one embodiment. At step 400, the computing system (e.g., a central computing system 300 shown in FIGS. 1B and 3) creates the network graph that represents the supply chain of a product. At step 410, the computing system determines an inventory policy (e.g., FIFO, LIFO, etc.) to each node in the network graph. At step 420, the computing system applies mass balance technique to each node in the network graph. At step 430, the computing system identifies an age of unsold inventory of the product at each node based on the applied inventory policy and mass balance technique. At step 440, the computing system recommends an action (e.g., returning the unsold inventory to a manufacture of the product, running sales promotion, etc.) based on the identified age of the unsold inventory. For example, if the identified age of the unsold inventory at a node (e.g., a retail store) is larger than a pre-determined threshold, the computing system may recommend running a sales promotion on the unsold inventory at the retail store.

Figure 6:
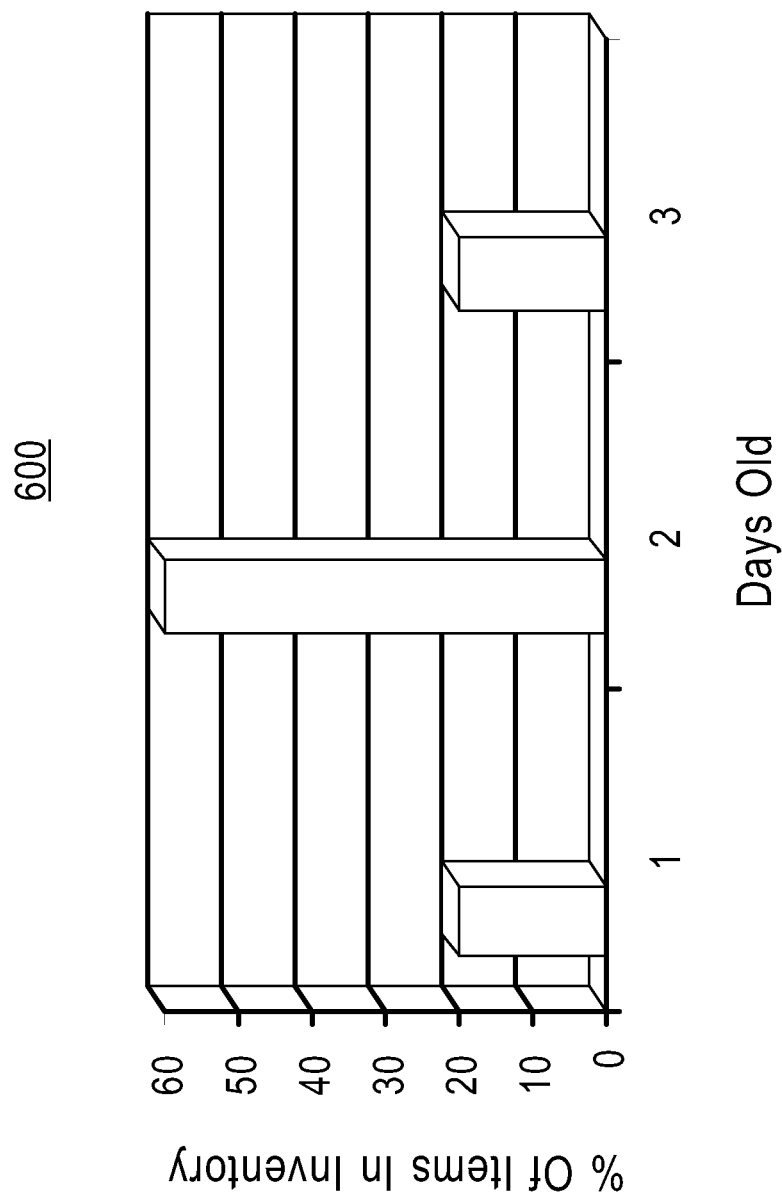
FIG. 6 illustrates a histogram generated as an output of the pseudo code illustrated in FIG. 5 in one embodiment.

FIG. 5 is exemplary pseudo code run by the computing system for tracking an inventory distribution of a perishable product in a supply chain in one embodiment. Input data "Node n" refers to a node in a the network graph that represents a retail distribution center or retail store, etc. Input data "Date d" refers to a reference date that is used to calculate an age of unsold inventory of a product. In this pseudo code, code block 500 defines inbound queue (i.e., a queue data structure for storing references to incoming products to "Node n") and outbound queue (i.e., a queue data structure for representing shipments or sales of product from "Node n"). Code block 510 implements an inventory policy, e.g., FIFO, in the "Node n." Code block 515 applies the mass balance technique to calculate the amount of the unsold inventory of the product. Code block 520 calculates the age of the unsold inventory of the product and outputs a histogram (e.g., a histogram 600 in FIG. 6) that shows an inventory age distribution of the unsold inventory of the product. Exemplary histogram 600 in FIG. 6 illustrates that 20% of the unsold inventory of the product are one day old. 60% of the unsold inventory of the product are 3 days old. 20% of the unsold inventory of the product are 3 days old.

FIG. 3 illustrates an exemplary hardware configuration of the computing system 300 that runs the method steps described in FIG. 1. The hardware configuration preferably has at least one processor or central processing unit (CPU) 311. The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting the system 300 to a data processing network, the Internet, an Intranet, a local area network (LAN), etc., and a display adapter 336 for connecting the bus 312 to a display device 338 and/or printer 339 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. In a further embodiment, the computing system analyzes properties of the enterprise and market social networks to build features for predictive models of a propensity for a customer to buy a product, or to close a deal in a particular period of time.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for tracking an inventory distribution of a perishable product in a supply chain, the method comprising:
  receiving shipment data and point of sale data for the perishable product from multiple locations in the supply chain;
  automatically creating, based on the obtained shipment data and point of sale data, a network graph that represents a flow of the perishable product in the supply chain, the network graph including: a plurality of nodes interconnected by a plurality of arcs, each of the plurality of nodes in the network graph representing one of the multiple locations in the supply chain, at least one arc that connects one of the plurality of nodes to another node of the plurality of nodes where each arc represents a shipment of the perishable product, the at least one arc including: 1) movement data of the perishable product including information associated with a movement of the perishable product throughout the supply chain and 2) a quantity data value of the perishable product moved;
  automatically identifying an age of unsold inventory of the perishable product at each node of the plurality of nodes of the network graph based on: the at least one arc and the data included in the at least one arc, a manufacture date of the unsold inventory of the perishable product, and a date indicating when the perishable product entered into the supply chain;

comparing, at each node of the plurality of nodes, the identified age of the unsold inventory of the perishable product against a threshold value;

in response to the comparing step, automatically providing a notification to a user at each node of the plurality of nodes of the network graph, the provided notification including: the identified age of the unsold inventory of the perishable product at the each node of the plurality of nodes, a recommended action to the user relating the perishable product at the each node of the plurality of nodes, and a percentage of the unsold inventory of the perishable product whose identified age is larger than the threshold at the each node of the plurality of nodes;

upon receiving the notification, modifying the movement of the perishable product among the plurality of nodes within the supply chain to decrease an amount of time that the perishable product is within the supply chain; and upon receiving the notification, adjusting, by a manufacturer of the perishable product, a production schedule of the perishable product in accordance with the identified age of the unsold inventory of the perishable product at the each node of the plurality of nodes, wherein a processor coupled to a memory device is configured to perform: the steps of the receiving, the automatically creating, the automatically identifying, the comparing, the automatically providing, the modifying, and the adjusting.

2. The method according to claim 1, wherein the movement data includes one or more of: a date of a shipment of the perishable product, a name of the perishable product, the manufacturer of the perishable product.

3. The method according to claim 1, wherein the point of sale data includes one or more of: quantity of the perishable product shipped, a location that ships the perishable product, a location that receives the perishable product.

4. The method according to claim 1, wherein the step of identifying the age of the unsold inventory of the perishable product includes: applying a mass balance technique at each node in the network graph and receiving information regarding an inventory rotation policy of each node in the network graph.

5. The method according to claim 4, wherein the step of applying the mass balance technique comprises: determining that a quantity of the perishable product entered at a first node in the network graph is equal to an addition of quantity of the perishable product remained at the first node and quantity of the perishable product shipped from the first node.

6. The method according to claim 4, the inventory rotation policy includes one or more of: FIFO (First-In-First-Out) and LIFO (Last-In-First-Out).

7. The method according to claim 1, wherein the network graph informs a manufacturer of the perishable product how an individual location of the supply chain maintains inventory of the perishable product and provides the age of the unsold inventory of the perishable product to each location of the supply chain.

8. The method according to claim 1, wherein the perishable product does not include RFID (Radio-frequency identification).

9. A system for tracking an inventory distribution of a perishable product in a supply chain, the system comprising:

a computing system including at least one memory device and at least one processor device connected to the memory device, wherein the computing system is configured to:

receive shipment data and point of sale data for the perishable product from multiple locations in the supply chain;

automatically create, based on the obtained shipment data and the point of sale data, a network graph that represents a flow of the perishable product in the supply chain, the graph including a plurality of nodes interconnected by a plurality of arcs, each of the plurality of nodes in the graph representing one of the multiple locations in the supply chain, at least one arc that represents a shipment of the perishable product, the at least one arc including: 1) movement data of perishable product including information associated with a movement of the perishable product throughout the supply chain and 2) a quantity data value of the product moved;

automatically identify an age of unsold inventory of the perishable product at each node of the plurality of nodes of the created network graph based on: the at least one arc and the data included in the at least one arc, a manufacture date of the unsold inventory of the perishable product, and a date indicating when the perishable product entered into the supply chain;

compare, at each node of the plurality of nodes, the identified age of the unsold inventory of the perishable product against a threshold value;

in response to the compare step, automatically provide a notification to a user at each node of the plurality of nodes of the network graph, the provided notification including: the identified age of the unsold inventory of the perishable product at the each node of the plurality of nodes, a recommended action to the user relating the perishable product at the each node of the plurality of nodes, and a percentage of the unsold inventory of the perishable product whose identified age is larger than the threshold at the location associated with the user;

upon receiving the notification, modify the movement of the perishable product among the plurality of nodes within the supply chain to decrease an amount of time the perishable product is within the supply chain; and upon receiving the notification, adjusting, by a manufacturer of the perishable product, a production schedule of the perishable product in accordance with the identified age of the unsold inventory of the perishable product at the each node of the plurality of nodes.

10. The system according to claim 9, wherein the movement data includes one or more of: a date of a shipment of the perishable product, a name of the perishable product, the manufacturer of the perishable product.

11. The system according to claim 9, wherein the point of sale data includes one or more of: quantity of the perishable product shipped, a location that ships the perishable product, a location that receives the perishable product.

12. The system according to claim 9, wherein to identify the age of unsold inventory of the perishable product, the computing system is further configured to apply a mass balance technique at each node in the network graph and receive information regarding an inventory rotation policy of each node in the network graph.

13. The system according to claim 12, wherein by applying the used mass balance technique, the computing system determines that a quantity of the perishable product entered at a first node in the network graph is equal to an addition of quantity of the perishable product remained at the first node and quantity of the perishable product shipped from the first node.

14. The system according to claim 13, wherein the inventory rotation policy includes one or more of: FIFO (First-In-First-Out) and LIFO (Last-In-First-Out).

15. The system according to claim 9, wherein the network graph informs a manufacturer of the perishable product how an individual location of the supply chain maintains inventory of the perishable product and provides the age of the unsold inventory of the perishable product to each location of the supply chain.

16. The system according to claim 9, wherein the perishable product does not include RFID (Radio-frequency identification).

17. A computer program product for tracking an inventory distribution of a perishable product in a supply chain, the computer program product comprising a non-transitory storage medium readable by a processing circuit and storing instructions run by the processing circuit for performing a method, the method comprising:
  receiving shipment data and point of sale data for the perishable product from multiple locations in the supply chain;
  automatically creating, based on the obtained shipment data and point of sale data, a network graph that represents a flow of the perishable product in the supply chain, the graph including a plurality of nodes interconnected by a plurality of arcs, each of the plurality of nodes in the network graph representing one of the multiple locations in the supply chain, at least one arc that connects one of the plurality of nodes to another node of the plurality of nodes where each arc represents a shipment of the perishable product, the at least one arc including: 1) movement data of the perishable product including information associated with a movement of the perishable product throughout the supply chain and 2) a quantity data value of the perishable product moved;
  automatically identifying an age of unsold inventory of the perishable product at each node of the plurality of nodes of the network graph based on: the at least one arc and the data included in the at least one arc, a manufacture date of the unsold inventory of the perishable product, and a date indicating when the perishable product entered into the supply chain;
  comparing, at each node of the plurality of nodes, the identified age of the unsold inventory of the perishable product against a threshold value;
  in response to the comparing step, automatically providing a notification to a user at each node of the plurality of nodes of the network graph, the provided notification including: the identified age of the unsold inventory of the perishable product at the each node of the plurality of nodes, a recommended action to the user relating the perishable product at the each node of the plurality of nodes, and a percentage of the unsold inventory of the perishable product whose identified age is larger than the threshold at the each node of the plurality of nodes;
  upon receiving the notification, modifying the movement of the perishable product among the plurality of nodes within the supply chain to decrease an amount of time the perishable product is within the supply chain; and
  upon receiving the notification, adjusting, by a manufacturer of the perishable product, a production schedule of the perishable product in accordance with the identified age of the unsold inventory of the perishable product at the each node of the plurality of nodes.

18. The computer program product according to claim 17, wherein the identifying the age of the unsold inventory of the perishable product includes: applying a mass balance technique at each node in the network graph and receiving information regarding an inventory rotation policy of each node in the network graph.

19. The computer program product according to claim 18, wherein the applying the mass balance technique comprises: determining that a quantity of the perishable product entered at a first node in the network graph is equal to an addition of quantity of the perishable product remained at the first node and quantity of the perishable product shipped from the first node.

20. The computer program product according to claim 18, the inventory rotation policy includes one or more of: FIFO (First-In-First-Out) and LIFO (Last-In-First-Out).

21. The computer program product according to claim 17, wherein the network graph informs a manufacturer of the perishable product how an individual location of the supply chain maintains inventory of the perishable product and provides the age of the unsold inventory of the perishable product to each location of the supply chain.

22. The computer program product according to claim 17, wherein the perishable product does not include RFID (Radio-frequency identification).

23. The method according to claim 1, wherein the recommended action is different to each location in the supply chain, and the different recommended action includes: returning the unsold inventory of the perishable product to the manufacturer of the product, and conducting a sales promotion for the unsold inventory of the perishable product.

24. The method according to claim 1, wherein in response to the provided notification, each location in the supply chain reacts differently to reduce the unsold inventory of the perishable product.

* * * * *